United States Patent
Wagner et al.

(10) Patent No.: US 9,869,751 B2
(45) Date of Patent: Jan. 16, 2018

(54) TWO WAY TIME OF FLIGHT POSITIONING AND SECURITY USING EAVESDROPPING

(71) Applicant: Intel IP Corporation, Santa Clara, CA (US)

(72) Inventors: Marcel Wagner, Munich (DE); Maximilian Tschirschnitz, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/988,265

(22) Filed: Jan. 5, 2016

(65) Prior Publication Data
US 2017/0192085 A1 Jul. 6, 2017

(51) Int. Cl.
*H04W 4/02* (2009.01)
*G01S 5/10* (2006.01)

(52) U.S. Cl.
CPC ............... *G01S 5/10* (2013.01); *H04W 4/02* (2013.01)

(58) Field of Classification Search
CPC ....... H04W 4/023; H04W 64/00; H04W 4/02; H04W 4/021; H04W 4/025; H04W 4/04; H04W 64/003; G01S 5/14; G01S 5/10; G01S 5/0236; G01S 5/0263; G01S 17/08; G01S 5/0036; G01S 5/0284; G01S 11/02
USPC .......... 455/456.1–457; 702/94, 95, 150–153
See application file for complete search history.

(56) References Cited

U.S. PATENT DOCUMENTS

| | | | | |
|---|---|---|---|---|
| 2008/0101277 A1* | 5/2008 | Taylor | ............ | G01S 5/0289 370/328 |
| 2010/0157810 A1* | 6/2010 | Oh | ............ | G01S 13/767 370/241 |
| 2013/0045759 A1* | 2/2013 | Smith | ............ | H04W 64/00 455/456.6 |
| 2014/0357292 A1* | 12/2014 | Walma | ............ | H04W 64/00 455/456.1 |
| 2015/0219749 A1* | 8/2015 | Dua | ............ | G01S 13/878 455/456.1 |

OTHER PUBLICATIONS

"Part 11: Wireless LAN Medium Access Control (MAC) and Physical Layer (PHY) Specifications", IEEE Std 802.11(Revision of IEEE Std 802.11-2007), (Approved Mar. 29, 2012), 2793 pgs.

"Part 11: Wireless LAN Medium Access Control (MAC) and Physical Layer (PHY) Specifications: Amendment 3: Enhancements for Very High Throughput in the 60 GHz Band", IEEE Std 802.11ad. (Amendment to IEEE Std 802.11™-2012, as amended by IEEE Std 802.11ae™-2012 and IEEE Std 802.11aa™-2012), (Dec. 28, 2012), 628 pgs.

(Continued)

*Primary Examiner* — Allahyar Kasraian
(74) *Attorney, Agent, or Firm* — Schwegman Lundberg & Woessner, P.A.

(57) ABSTRACT

Disclosed in some examples, are methods, systems, devices, and machine-readable mediums which provide for improved location of mobile devices using TOF measurements by using information from the reception of location messages at locator nodes that are not the intended recipient of those messages.

19 Claims, 9 Drawing Sheets

(56) References Cited

OTHER PUBLICATIONS

"Part 11: Wireless LAN Medium Access Control (MAC) and Physical Layer (PHY) Specifications: Amendment 4: Enhancements for Very High Throughput for Operation in Bands below 6 GHz", IEEE Std 802.11ac.(Amendment to IEEE Std 802.11™-2012, as amended by IEEE Std 802.11ae™-2012, IEEE Std 802.11aa™-2012, and IEEE Std 802.11ad™-2012), (2013), 425 pgs.

"Part 11: Wireless LAN Medium Access Control (MAC) and Physical Layer (PHY) Specifications; Amendment 1: Prioritization of Management Frames", IEEE Std 802.11ae(Amendment to IEEE Std 802.11™-2012), (Approved Mar. 29, 2016), 52 pgs.

"Part 11: Wireless LAN Medium Access Control (MAC) and Physical Layer (PHY) Specifications; Amendment 5: Television White Spaces (TVWS) Operation", IEEE Std 802.11af (Amendment to IEEE Std 802.11™-2012, as amended by IEEE Std 802.11ae™-2012, IEEE Std 802.11aa™-2012, IEEE Std 802.11ad™-2012, and IEEE Std 802.11ac™-2013), (Approved Dec. 11, 2013), 198 pgs.

"Part 11: Wireless LAN Medium Access Control; Amendment 2: MAC Enhancements for", IEEE Std 802.11aa (Amendment to IEEE Std 802.11™-2012, as amended by IEEE Std 802.11ae™-2012), (Approved Mar. 29, 2012), 162 pgs.

"Wi-Fi Positioning System", Wikipedia, The free encyclopedia, [Online]. [Archived Aug. 2, 2016]. Retrieved from the Internet: <URL: https://en.wikipedia.orgi/wiki/Wi-Fi‾positioning‾system>, (Accessed: Aug. 2, 2016), 6 pgs.

"Part 15.4: Low-Rate Wireless Personal Area Networks (LR-WPANs)", IEEE Std 802.15.4(Revision of IEEE Std 802.15.4-2006), 314 pgs, Sep. 5, 2011.

* cited by examiner

TWO WAY TIME OF FLIGHT POSITIONING AND SECURITY USING EAVESDROPPING

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright INTEL, All Rights Reserved.

TECHNICAL FIELD

Embodiments pertain to improved two way time of flight positioning using fewer messages. Some embodiments relate to verification of WLAN positioning using eavesdropping techniques.

BACKGROUND

Part of providing location-based services includes positioning the mobile device. A mobile device's position may be determined from measurements taken from radio signals. For example, a receiver may estimate its position by measuring the time it takes for signals sent by a number of different transmitters to reach it.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Because radio waves propagate at approximately the speed of light, the distance d between a receiver and a transmitter may be calculated by multiplying the time it takes for a radio signal to reach the receiver by c (where c is the speed of light, or ~299792458 m/s). If the position of the transmitter is known, then it is known that the receiver is within a radius d of the transmitter. If the receiver may determine d for at least three transmitters, the receiver's position is in the intersection of three circles where the center point of each respective circle is the location of each respective transmitter and the radius of each respective circle is the respective distance between the respective transmitter and the receiver. This positioning technique is called Time of Flight (TOF) positioning.

Figure 1:
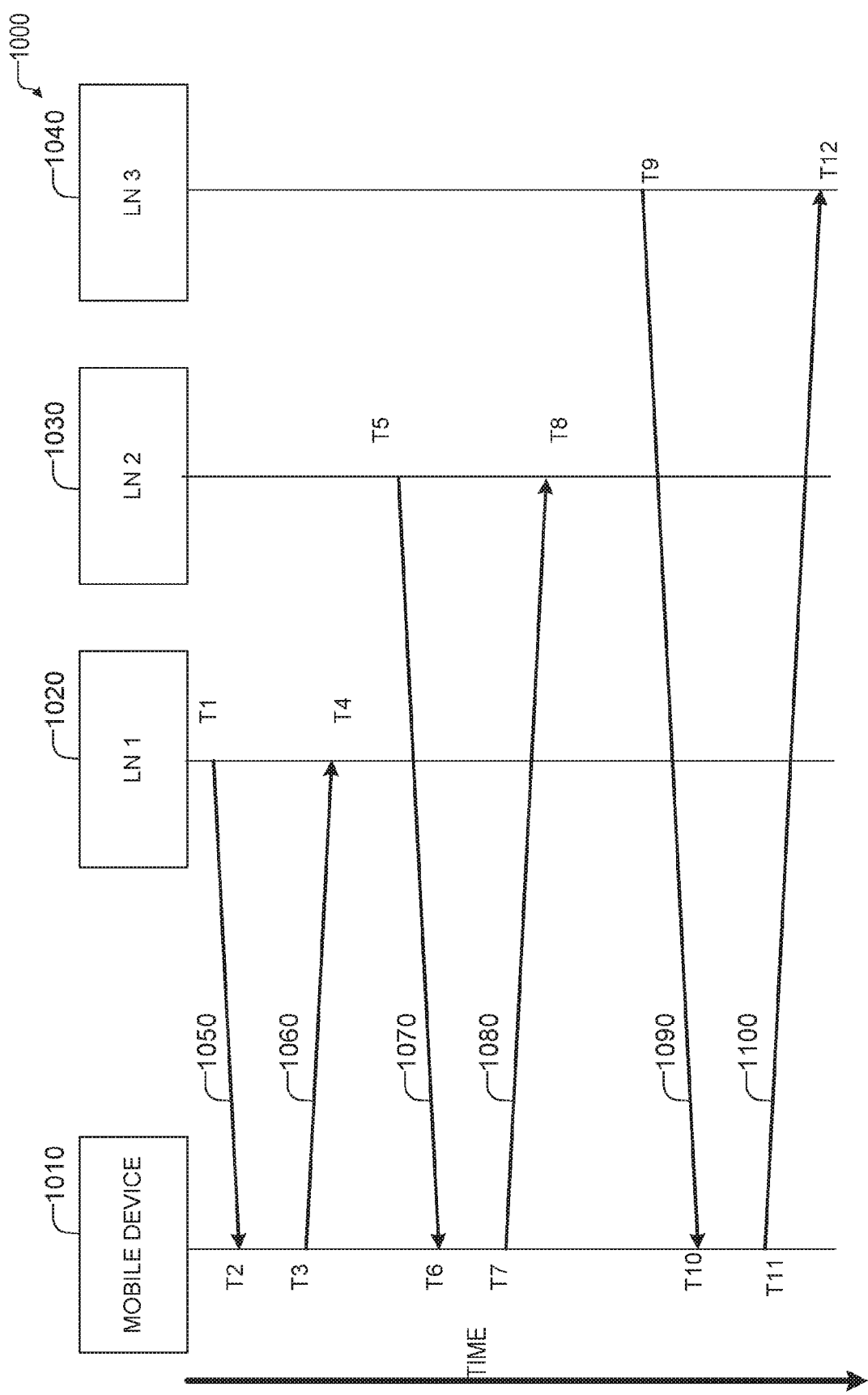
FIG. 1 shows a message sequence chart of a TOF positioning according to some examples of the present disclosure.

Turning now to FIG. 1, a message sequence chart 1000 of a TOF positioning is shown according to some examples of the present disclosure. Mobile device 1010 is positioned by at least three locator nodes (LN) 1020, 1030, and 1040. Mobile device 1010 is a computing device that is to be located and may include a smartphone, desktop, tablet, laptop, smart watch, microcontroller, or other computer. LNs are computing devices participating in the location of the mobile device 1010 as described herein. An example LNs include an Access Point (AP) of a Wireless Local Area Network (WLAN), a radio beacon node (broadcasting any radio type including Ultra Wide Band (UWB) and WLAN), or the like. LN1 1020 sends a first message 1050 at time T1 to mobile device 1010. Mobile device 1010 receives message 1050 at time T2, prepares and sends a message (e.g., an Acknowledgement message) at time T3 which arrives at LN1 1020 at time T4. With the response message (or by a different communication channel), mobile device 1010 sends to LN1 1020 a value of $\Delta T1 = T3 - T2$ which represents the time the mobile device 1010 spent processing the message and preparing the reply. LN1 1020 then calculates the distance between LN1 1020 and mobile device 1010 using the formula:

$$D1 = (T4 - T1 - \Delta T1)/2 * c$$

LN2 1030 repeats the process by sending a message 1070 at time T5 to mobile device 1010. Mobile device 1010 receives message 1070 at time T6, prepares and sends a message (e.g., an Acknowledgement message) at time T7 which arrives at LN2 1030 at time T8. With the response message (or by different communication channels), mobile device 1010 sends to LN2 1030 a value of $\Delta T2 = T7 - T6$ which represents the time the mobile device 1010 spent processing the message and preparing the reply. LN2 1030 then calculates the distance between LN2 1030 and mobile device 1010 using the formula:

$$D2 = (T8 - T5 - \Delta T2)/2 * c$$

LN3 1040 repeats the process by sending a message 1090 at time T9 to mobile device 1010. Mobile device 1010 receives message 1090 at time T10, prepares and sends a message (e.g., an Acknowledgement message) at time T11 which arrives at LN3 1040 at time T12. With the response message, mobile device 1010 sends to LN3 1040 a value of $\Delta T3 = T11 - T10$ which represents the time the mobile device 1010 spent processing the message and preparing the reply. LN3 1040 then calculates the distance between LN3 1040 and mobile device 1010 using the formula:

$$D3 = (T12 - T9 - \Delta T3)/2 * c$$

The mobile device's position may then be determined using trilateration. First the three known geolocations of the LNs are represented as an x and a y (latitude and longitude respectively) and oriented such that one LN is at the origin (0,0) and one LN is at a point on the x-axis (p,0) and the third LN (q,r) will be realigned as a point relative to the first two. The coordinates of the mobile device (x,y) are given by:

$$x = \frac{D1^2 - D2^2 + (p)^2}{2p} \text{ and } y = +/-\sqrt{D1^2 - \left(\frac{D1^2 - D2^2 + p^2}{2p}\right)^2}$$

The correct value of y (the + or the − value or the case that the trilateration is not solvable) is found by plugging the value of x and both y values into this equation:

$$D3 = (x-q)^2 + (y-r)^2$$

Once the coordinates are calculated, they may be reverted back to the original orientation by reversing the operations done to reorient the points in the preliminary calculations.

Figure 2:
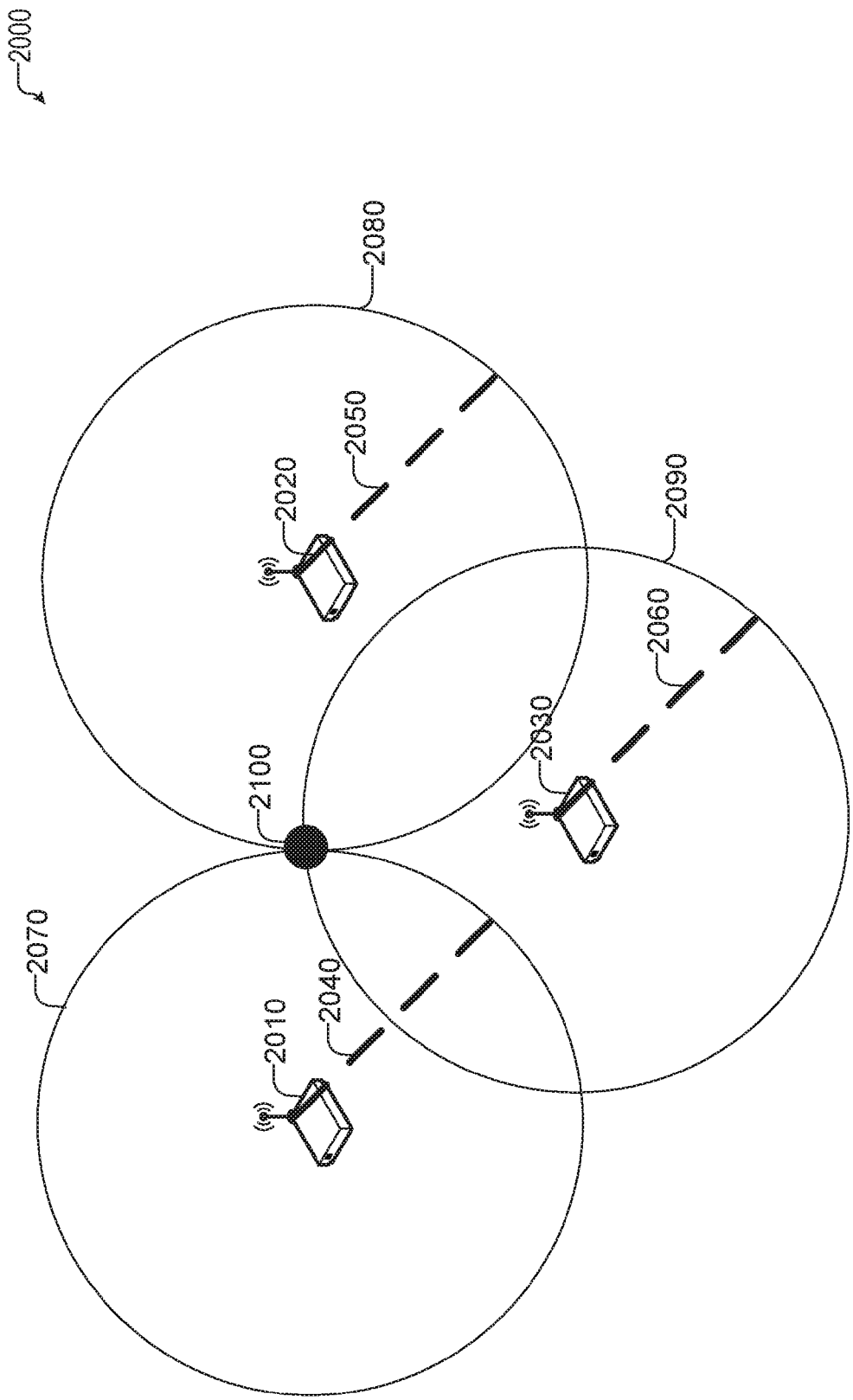
FIG. 2 shows a diagram of the position of the mobile device according to the present disclosure.

Turning now to FIG. 2, a diagram 2000 of the position of a mobile device is shown according to the present disclosure. LN1 2010, LN2 2020, and LN 3, 2030 (which in some examples may be LN 1 1020, LN2 1030, and LN 3 1040 from FIG. 1) have each established a calculated distance to the mobile device 2100, of D1 2040, D2 2050 and D3 2060 respectively. D1 2040, D2 2050, and D3 2060 may be thought of as a radius of a circle 2070, 2080, and 2090 respectively with the LNs at the center point of each respective circle. The position of the mobile device 2100 is the intersection of these circles.

The above described mechanism used two-way messaging to eliminate the need for the clock on the mobile device 1010 to be synchronized with each of the LNs 1020-1040. For example, traditional mechanisms embed a transmission time of the message in the message itself and the receiver subtracts the reception time for the transmission time to ascertain TOF. If, however, the clocks between the receiver and the transmitter are not synchronized, this approach leads to errors. In the example of FIG. 1, absolute timing is not used, just an elapsed time (e.g., between T1 and T4, and between T2 and T3).

This mechanism is time consuming and power intensive (as it requires six messages), it also is open to being compromised by unscrupulous parties. For example, a mobile device may be interested in faking its location to one or more LNs. It may do this in order to gain access to location based services, thwart government agencies, and the like. It may do this by misreporting ΔT1, ΔT2, or ΔT3 to make itself appear to be in a different location than it is. For example, the mobile device 1010 may increase the reported ΔT measurements to cause the LN to believe that the distance between it and the mobile device is closer than it really is. Likewise, the mobile device may decrease the reported ΔT measurements or delay answering to cause the LN to believe that it is farther away than it really is. A clever adversary may use different ΔT values for different LNs, to ensure convergence of the location equations at a fake location. Various use cases for ensuring a proper position of the mobile include restricting Wi-Fi Protected Setup (WPS) configuration in WLAN networks to mobile devices that are in close physical proximity as a means to improve security. In another example, WLAN providers (e.g., coffee shops) may wish to restrict their WLAN hotspots to mobiles within a certain proximity. Other examples include unlocking workstations based upon an authorized user's proximity to the workstation, physically unlocking car doors when a user is close to the car, and the like. Thus detecting location spoofing is an important first step.

Disclosed in some examples, are methods, systems, devices, and machine-readable mediums which provide for improved location of mobile devices using TOF measurements by using information from the reception of messages sent by the mobile device at locator nodes that are not the intended recipient of those messages. For example, turning back to FIG. 1, LN2 1030 and LN 3 1040 may take the role of "listener" LNs and listen to the messaging exchange 1050 and 1060 between the mobile device 1010 and the LN 1 1020. The time when message 1060 arrives at LN 2 1030 and LN3 1040 may be reported back to LN1. LN1 1020 may then calculate the distance between the mobile device 1010 and LN2 1020 and LN3 1030 as well as the distance between LN1 1020 and the mobile device 1010. If the locations of LN1 1020, LN2 1030 and LN3 1040 are known, a position of the mobile may be found by finding the intersection of the circles made with center points being the location of each particular LN and the radius being the corresponding determined distance to the particular LN from the mobile device 1010. If the triangulation equations have a solution, then not only does LN1 1020 know the position of the mobile device, but also that the mobile device is not faking ΔT.

If the mobile device is providing an accurate ΔT this method allows the positioning of the mobile device using a single message exchange. Additionally, this method allows the LNs to assess the accuracy of the mobile device provided pieces of the location solution, namely ΔT. As previously discussed, in order for the mobile device to successfully fake its position, it carefully manipulates the ΔT reported to different nodes so that the solution converges on the location that the mobile device wants it to converge upon. By utilizing the known distance between locator nodes, and by utilizing the difference in the time it took each LN to receive the messages, a full set of location data is obtained through a single messaging interaction. Because the mobile device has no opportunity to adjust the faked ΔT for other LNs, the solution of the trilateration as described above will not be solvable to a desired accuracy and the system will become aware that the position of the mobile device is not dependable.

As used herein for descriptive convenience, a messaging LN is an LN that is the LN sending the message to the mobile device and is the intended recipient of the reply from the mobile device. In the example of FIG. 1, for messages 1050 and 1060, LN1 1010 is the messaging LN. A listening LN is an LN that eavesdrops on this message exchange. LNs may take on roles of both listening and messaging LN. For example, if the system performs more than one messaging exchange (for increased accuracy), the LNs may take turns being the messaging LN and the listening LNs. Furthermore, while the description herein describes examples in which the messaging LN calculates the positions from the timings it observes as well as the timings sent by the assisting LNs, in other examples, these calculations may be done by other LNs in the system or by a separate computing device. In these examples, the observed timings from the assisting LNs as well as the observed timings of the messaging LNs may be sent to the LN or other computing device that is doing the calculations.

In some examples, LNs are communicatively coupled to one another, have synchronized clocks, and the LNs are stationary with a position that is known to the other LNs participating in the location system. LNs may synchronize their clocks using algorithms such as the Berkeley Algorithm, Cristian's algorithm, or using the Precision Time Protocol (PTP) defined by an IEEE 1588 family of standards (such as IEEE1588-2008). LNs may have a Global Positioning System receiver to establish their precise position, or the position may be configured into the LN when the LN is commissioned. In some examples, LNs may discover each other through broadcast messages, a device (e.g., an external server or another LN) that serves as a registry for LNs, be preconfigured with information about other LNs in the area, or the like. Configuration information exchanged between LNs about each other, or preconfigured, may include geo-location, timing information, contact information (e.g., network address information), and the like. As noted previously, LNs also exchange with each other observed timing information from mobile devices.

Figure 3:
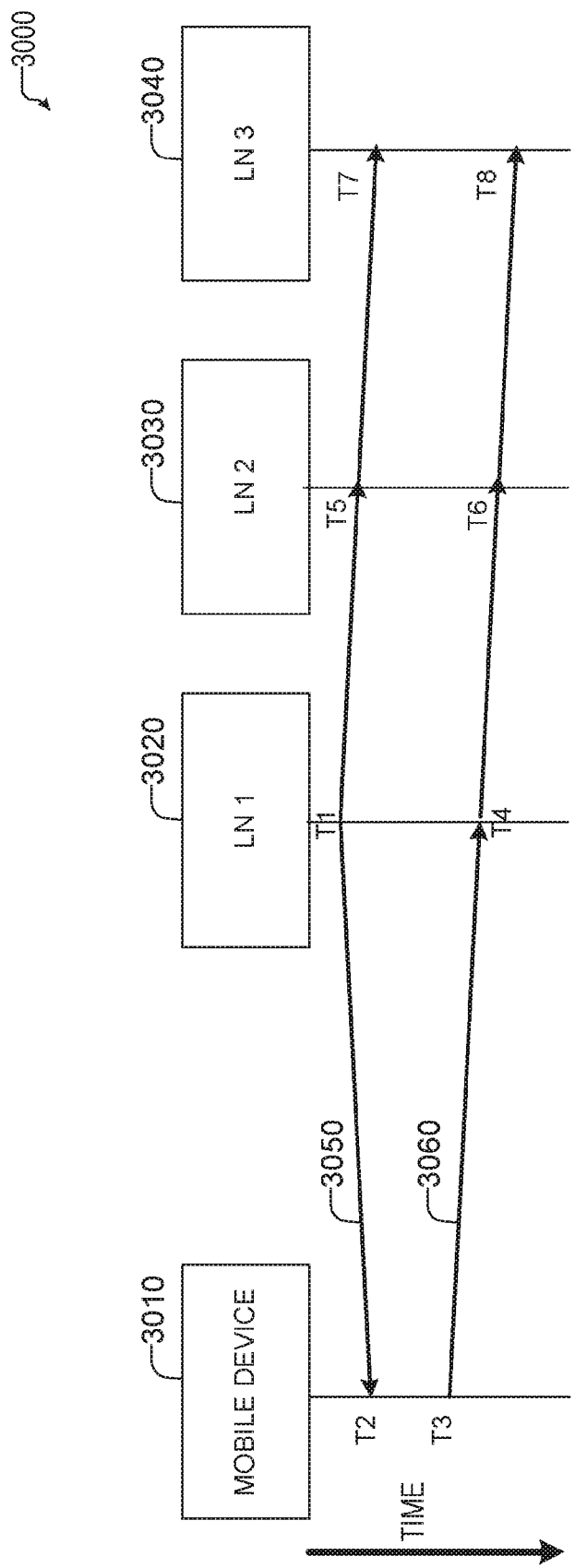
FIG. 3 shows a message sequence chart of a TOF positioning according to some examples of the present disclosure.

Turning now to FIG. 3, a message sequence chart 3000 of a TOF positioning is shown according to some examples of the present disclosure. LN1 3020 is the messaging LN and LN2 3030 and LN3 3040 are listening LNs. LN1 3020 sends message 3050 at time T1. As before, mobile device 3010 receives this message at time T2. At time T5, LN2 3030 also receives message 3050. At time T7, message 3050 is received by LN3 3040. Mobile device 3010 processes the message 3050 and then, at T3 sends a reply 3060, including the processing delay ΔT which is the time elapsed between T2 and T3. Reply 3060 arrives at LN1 3020 at time T4, by LN 3030 at time T6, and by LN3 at time T8. LN2 3030 and LN3 3040 send time T6 and T8 to LN1 3020 (messaging not shown). LN1 3020 may calculate the distance between LN1 3020 and the mobile device 3010 as before:

$$D1=(T4-T1-\Delta T1)/2*c$$

Knowing T6 and D1, the distance between the mobile device 3010 and LN2 3030 may be calculated by LN1 3020 as:

$$D2=((T6-T4)*c)+D1$$

That is, the distance between LN2 3030 and the mobile device 3010 is equal to the sum of the distance between LN1 3020 and the mobile device 3010 and the difference in time it took for the message to reach LN2 3030 (compared to LN1) multiplied by the speed of light. T6−T4 may be positive, which indicates that the mobile device 3010 is farther away from LN2 3030 than LN1 3020, or may be negative indicating that the mobile device is closer to LN2 3030 than LN1 3020.

Similarly, LN1 3020 may also calculate:

$$D3=((T8-T4)*c)+D1$$

Again, T8−T4 may be positive, which indicates that the mobile device is farther away from LN3 3040 than LN1 3020, or may be negative indicating that the mobile device is closer to LN3 3040 than LN1 3020.

Using these distances along with the known coordinates of LN1 3020, LN2 3030, and LN3 3040, LN1 3020 may calculate the position of the mobile device 3010 by calculating an intersection of circles with center points at the location of LN1 3020, LN2 3030, and LN3 3040 with radii D1, D2, and D3, respectively. For example, LN1 3020 may use the same trilateration formulas described above.

Note that the above formulas utilized time synchronized LNs. If the LNs are not time synchronized, then additional calculations may be done using T7 and T8 to create synchronized timings. For example LN2 3030 may send T5 as well as T6. Since LN1 3020 knows T1, and knows the position of LN2 3030 (and therefore the distance between LN1 3020 and LN2 3030), LN1 3020 knows when message 3050 should arrive at LN2 3030. For example, T5, adjusted to the local clock of LN1 3020, denoted as T5', should be:

$$T5'=T1+(\text{distance between LN1 and LN2}*c)$$

LN1 3020 may then calculate a clock adjusted T6' (where T6 is the reported T6 from LN2 3030) using the formula:

$$T6'=T6-(T5-T5')$$

LN1 may then use T6' instead of the reported T6 from LN2.

As noted previously, this method allows for detection of location spoofing by the mobile device. If ΔT is misreported by the mobile device 3010, the circles with center points at the location of LN1 3020, LN2 3030, and LN3 3040 with radii D1, D2, and D3, respectively, will not have a single intersection and thus, no unique solution. In this case, the value of D1 calculated by LN1 3020 will be inaccurate. Let D1^ be the accurate distance and ΔT1^ be the accurate ΔT1 value. D1^=D1+x, where $$x=(\Delta T1-\Delta T1\hat{})*c$$

where ΔT1 is the reported (inaccurate) time, and ΔT1^ is the accurate time.

Figure 4:
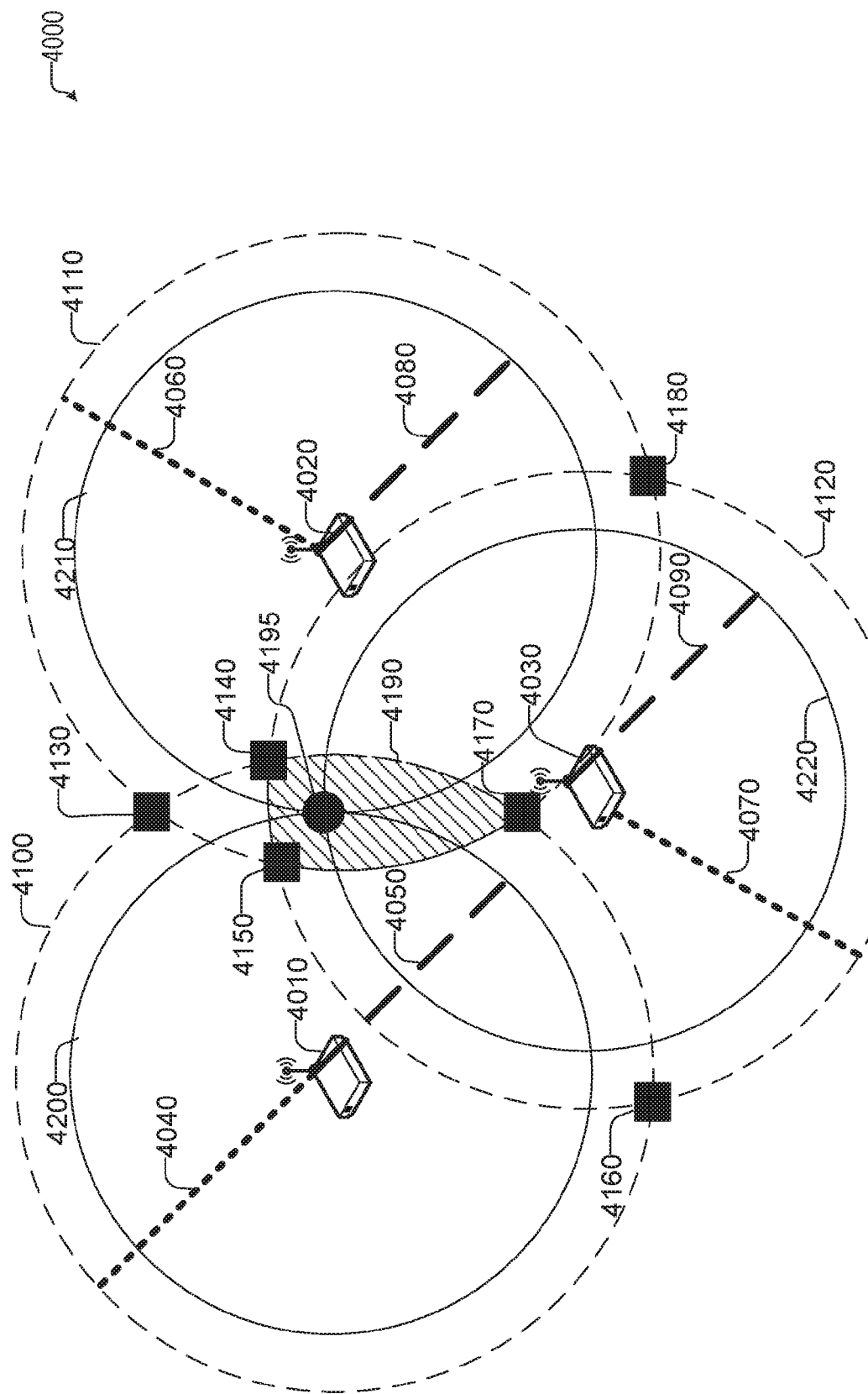
FIG. 4 shows a diagram of the position of the mobile device according to the present disclosure.

Because the value of D1 is used in computing D2 and D3, any error in D1, namely x, will cause a similar error in D2 and D3. Because the values of D1, D2, and D3 are wrong, there is no intersection between the three circles in this example. For example, FIG. 4 shows a diagram 4000 of the position of the mobile device according to some examples of the present disclosure. In FIG. 4, the mobile device has reported an incorrect ΔT. LN1 4010 has calculated a distance of D1 4040. D1 is larger than true distance D1^ 4050 as D1 was calculated based upon a value of ΔT that is shorter than the true ΔT^. Similarly, because the distances between LN2 4020 and LN3 4030 is based upon D1, distance D2 4060 and distance D3 4070 are larger than true distance D2^ 4080 and D3^ 4090. As a result, circles 4100, 4110, and 4120 formed from inaccurate D1, D2, and D3 do not have a single intersection and thus not a unique solution, rather, these circles intersect each other at points 4130, 4140, 4150, 4160, 4170, and 4180. Indeed, the mobile device could be in any point in area 4190. As may be seen from the real circles 4200, 4210, and 4220 (created with the accurate distances D1^, D2^, and D3^) the mobile device's real location is 4195.

In some examples, the timings of the mobile device and of the LNs may be subject to slight error that is not the result of the mobile device misreporting ΔT. Other errors may also include rounding errors, and the like. In these cases, the system may determine convergence has occurred when the area of intersection of the circles is below a predetermined threshold level of accuracy.

In some examples, for additional accuracy the operations of FIG. 3 may be performed multiple times. For example, LN2 3030 may take a turn as the messaging LN and LN1 3020 and LN3 3040 may be the assisting nodes. LN3 3040 may also take a turn as the messaging LN and LN1 3020 and LN2 3030 may be the assisting nodes. In these examples, one of the LN nodes may receive the timings observed from each of the positioning procedures and may calculate a more accurate position than may be determined through just a single procedure. For example, the calculated distances between the LNs and the mobile device may be averaged across the positioning procedures that are performed and the mobile device's position may be calculated using the averaged distances. In other examples, the median calculated distance between the LNs and the mobile device may be used. In other examples, other filtering methods may be utilized. In other examples, multiple sets of mobile device positioning coordinates are obtained, and the mobile device's position from each must be within a predetermined margin of error in order to be determined as accurate.

In still other examples, the use of listening LNs is only to determine if a mobile device is spoofing a particular LN. That is, the mobile device is positioned by performing the operations of FIG. 3 three separate times, each time with a different messaging LN. If the solution converges for each of the separate procedures, then the location of the mobile device may be calculated by positioning the mobile device using the distance calculated to the mobile device from each messaging LN. That is, the distance between LN1 and the mobile device is used from the procedure where LN1 is the messaging node, the distance between LN2 and the mobile device is used from the procedure where LN2 is the messaging node, and the distance between LN3 and the mobile device is used from the procedure where LN3 is the messaging node. If any one of the location procedures fail to converge with a single solution, then the procedure fails and the location based services may be denied.

Once the mobile device is positioned, one or more of the LNs (e.g., the master LN, the messaging LN, or the like) may pass the mobile device's position back to the mobile device, to a provider of location-based-services, or the like. Example location-based services include providing the mobile device's location to emergency responders, geofencing applications, content delivery, and the like. Positioning the mobile device using just two messages (rather than potentially six) saves valuable power on the mobile device, provides a quicker location of the mobile device, and ensures more trusted results. This may be especially beneficial for certain location based services such as providing a location for emergency responders.

Figure 5:
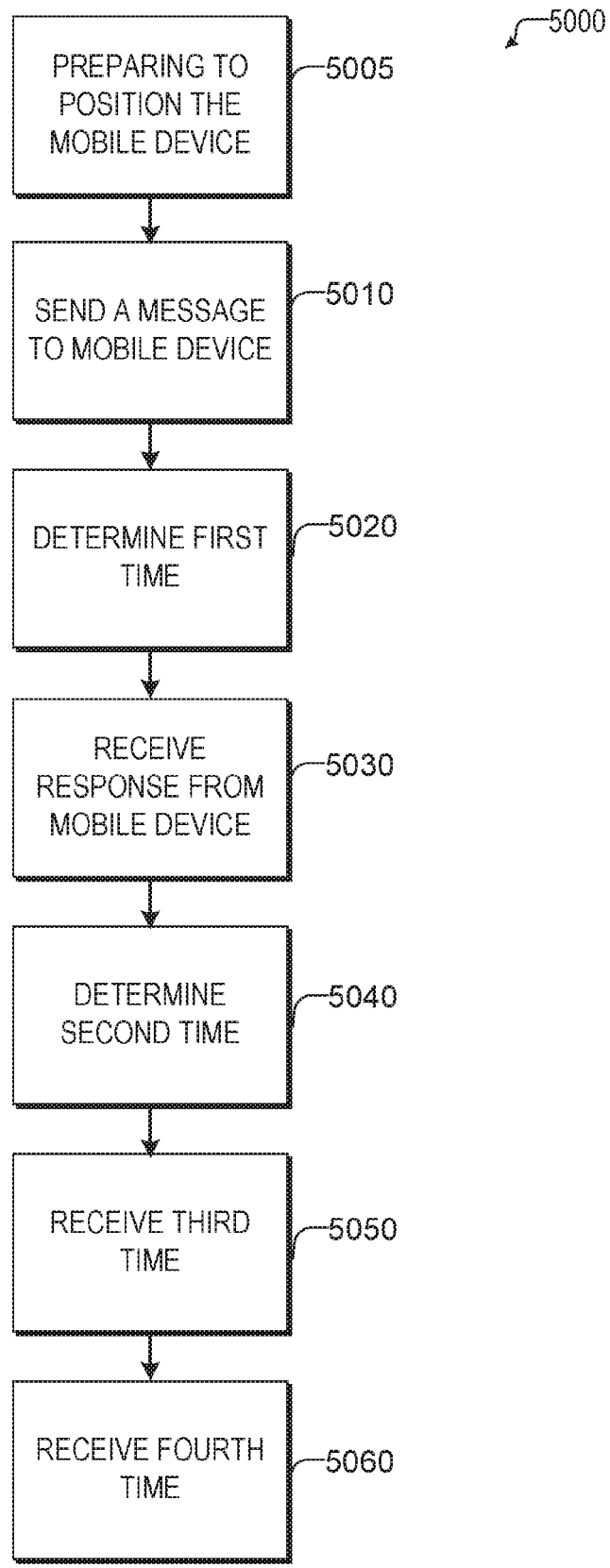
FIG. 5 shows a flowchart of a method of a messaging LN receiving information to use in calculating a position of a mobile device according to some examples of the present disclosure.

Turning now to FIG. 5 a flowchart of a method 5000 of a messaging LN receiving information to use in calculating a position of a mobile device is shown according to some examples of the present disclosure. At operation 5005 the LN may begin preparations to position the mobile device. This may include determining that a position of the mobile device has been requested—e.g., by the mobile device through a request message, by another LN, by a request from the mobile device for access to one or more location based services, or the like. In some examples, this may also include sending messages to one or more listening LNs to listen for a response from the mobile device to a message sent from the LN. The LN may select a plurality of neighboring LNs that are within a predetermined distance from the LN. As already noted, each LN is aware of the position of a plurality of other LNs through a message exchange between LNs, registration with a central server, or the like. Neighboring LNs may be selected by selecting LNs that are a predetermined distance from the messaging LN.

At operation 5010 an LN sends a message to the mobile device. This message may be a message that is specifically used for locating the mobile device or may be another message regularly used in a wireless communication session with the mobile device outside of the location procedures, for example, a data packet, a control packet, or the like. At operation 5020 the mobile device determines a first time T1 when the message was sent at operation 5010. At operation 5030 the LN receives the location response from the mobile device. This response may be a message that is used for responding to the message sent at operation 5010 or may be a response to a message regularly used in a wireless communication session with the mobile device outside of the location procedures, for example, an acknowledgement packet or the like. At operation 5040 the LN may determine a second time T2, which is the time that the response was received at operation 5030. At operation 5050 the LN may receive a third time from a second LN which corresponds to the time that the second LN received the message sent from the mobile device to the first LN. At operation 5060 the LN may receive a fourth time from a third LN which corresponds to the time that the third LN received the message sent from the mobile device to the first LN. Additional times from additional LNs may also be received and utilized to calculate a position of the mobile device.

Figure 6:
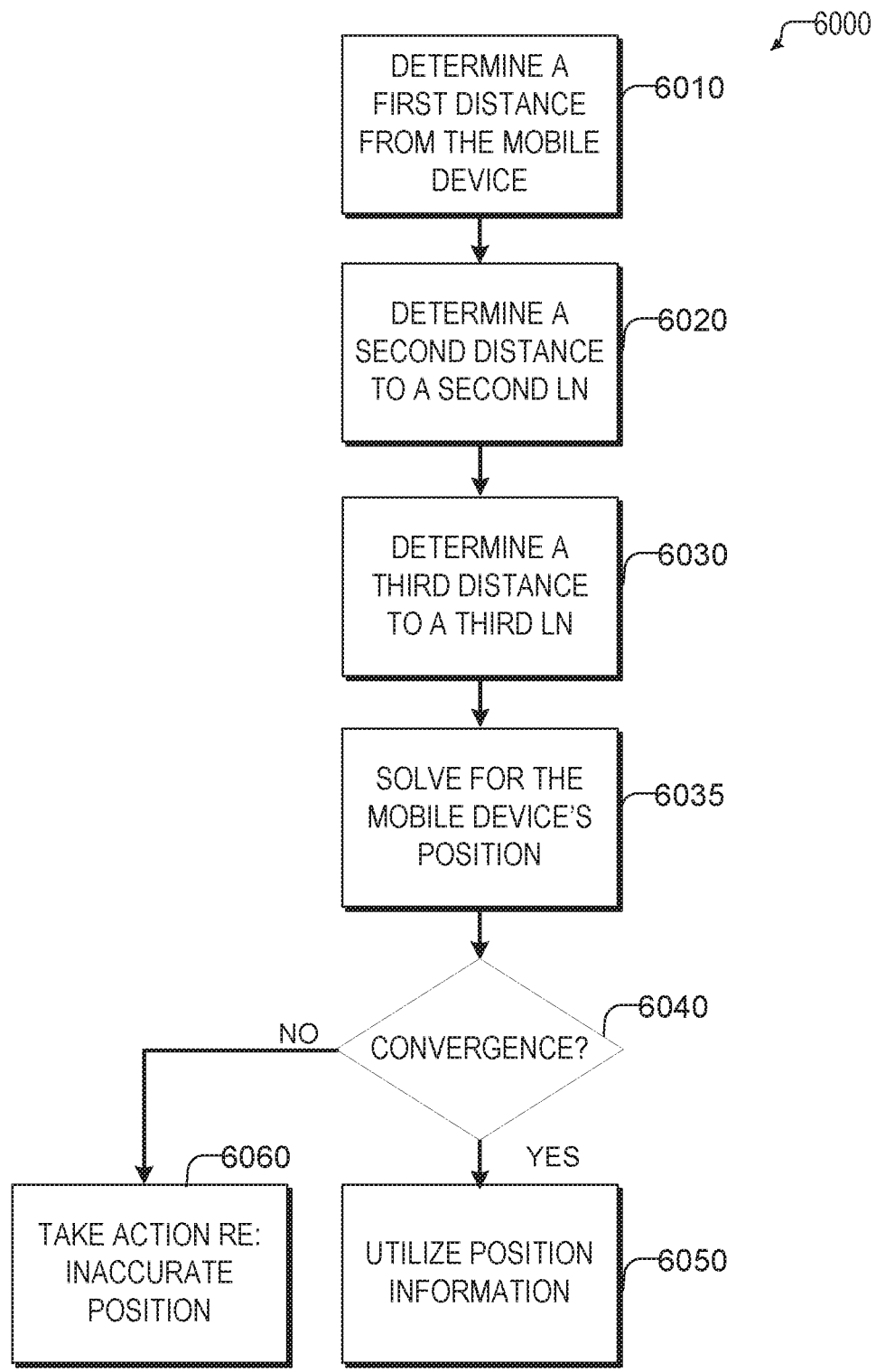
FIG. 6 shows a flowchart of a method of calculating a position of a mobile device using the information determined in FIG. 5 according to some examples of the present disclosure.

Turning now to FIG. 6 a flowchart of a method 6000 of calculating a position of a mobile device using the information determined in FIG. 5 is shown according to some examples of the present disclosure. At operation 6010 a first distance from the mobile device to the LN is calculated. The response from the mobile device (or a separate message) includes a value, $\Delta T$ which represents the time between receipt of the message and sending the reply at the mobile device. In some examples, the distance is calculated using: $D1=((\text{time determined at operation } 5040 - \text{time determined at operation } 5020) - \Delta T)/2 * c$, where c is the value of the speed of light. At operation 6020, the LN calculates a second distance to a second LN based upon D1 and the difference between the third time and the second time. $D2=((\text{third time}-\text{second time})*c)+D1$. At operation 6030, the LN calculates a third distance to a third LN based upon D1 and the difference in the fourth time and the second time. $D2=((\text{fourth time}-\text{second time})*c)+D1$. Other distances to other LNs may also be calculated in the same or a similar manner as part of this operation. At operation 6035 the LN may calculate a position of the mobile device utilizing the first, second, and third distances to respective LNs and known geolocations of the LN, the second LN, and the third LNs using trilateration or another suitable navigation formula.

At operation 6040 a check is made to determine whether or not the mobile device's position was determined at operation 6035. In some examples, this may be comparing the area of intersection of the circles formed with the LNs position as a center point and the respective distance from the mobile device to each respective LN as the radius of the circle to a predetermined accuracy threshold. If the area is lower than this threshold, then the mobile device's position is considered to be determined and the position information is utilized at operation 6050. In some examples, this includes one or more of: providing one or more location based services, notifying the mobile device of its position, notifying one or more other LNs or other computing devices of the position or the like. If the area is greater than this threshold, then the mobile device is either spoofing its position or its hardware may be defective (e.g., defective timer). If this is the case, at operation 6060, the system may take action regarding the inaccurate position. This may include denying the use of location based services, informing the mobile device, warning other LNs, or other computing devices, or the like.

Figure 7:
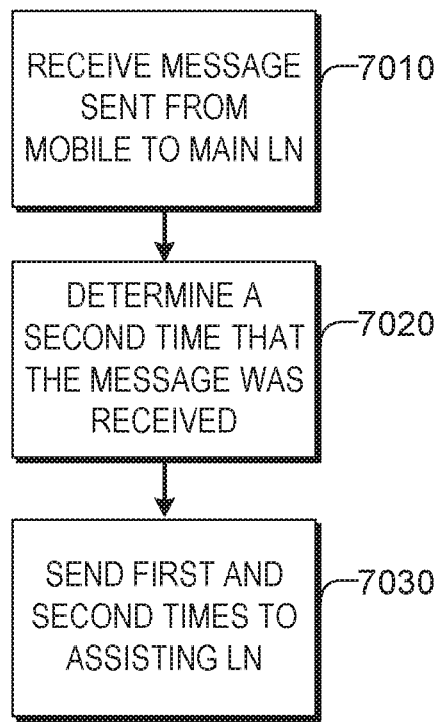
FIG. 7 shows a flowchart of a method of a listening LN assisting the messaging LN in locating the mobile device according to some examples of the present disclosure.

Turning now to FIG. 7 a flowchart of a method 7000 of a listening LN assisting the messaging LN in locating the mobile device is shown according to some examples of the present disclosure. In some examples, LNs are always monitoring for location messages sent by other LNs to mobile devices. In these examples, no pre-messaging is required between the messaging LN and the listening LNs. In these examples, data in the message sent from the mobile device (e.g., $\Delta T$, header fields, and the like) may indicate to the listening LNs that another LN (the messaging LN) is attempting to determine the location of a mobile device. The destination address in the message headers informs the listening LN which LN is the messaging LN, and thus which LN to send the time of receipt to. In other examples, the listening LN may begin listening for the message from the mobile device to the messaging LN when the listening LN receives the message from the messaging LN to the mobile device (e.g., message 3050 from FIG. 3).

In other examples, the messaging LN may communicate to one or more listening LNs for assistance prior to the message exchange between the LN and the mobile device. In examples in which certain communication parameters may prevent listening LNs from eavesdropping on the communications between the messaging LN and the mobile device (e.g., frequency hopping parameters, orthogonal codes, encryption, and the like), these parameters may be shared amongst LNs ahead of time.

At operation 7010 the listening LN may receive the reply from the mobile device to the message from the messaging LN. This message is from the mobile device and addressed to, and sent to, the messaging LN. This message is not addressed to the listening LNs. The mobile device may be unaware that the listening LNs are eavesdropping on the messaging between the messaging LN and the mobile device. At operation 7020, the listening LN may determine the time that the message was received. As noted earlier, in some examples, the messaging LNs and the listening LNs have synchronized clocks. At operation 7030 the listening LN sends the first time to the messaging LN.

Figure 8:
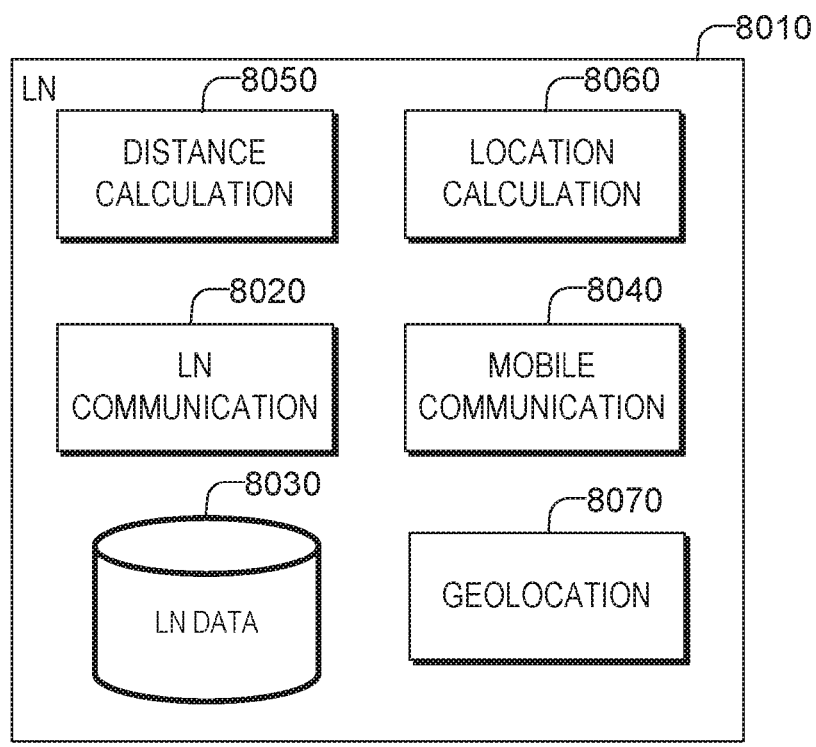
FIG. 8 shows a logical schematic of an LN 8010 according to some examples of the present disclosure.

Turning now to FIG. 8 a logical schematic of an LN 8010 is shown according to some examples of the present disclosure. LN 8010 is a computing device participating in the location of the mobile device as described herein. Example LNs include a WLAN AP, a radio beacon node (e.g., a UWB or WLAN), a desktop computer, a laptop computer, a tablet computer, a smartphone, or any other suitable device capable of generating the appropriate radio signals. In some examples, LN includes LN communication module 8020 which may communicate with one or more other LNs to exchange location information, notify other LNs that this LN is a messaging LN and requesting listening LNs to send timing information, be notified by other messaging LNs that they are requesting this LN be a listening LN, send and receive timings, receive information about other LNs (and store this information in the LN data store 8030), send information about this LN to other LNs and the like. Information sent and received about the LNs includes geolocation information of the LNs, messaging addresses, and the like. These inter-LN messages may be sent as broadcast messages, may be sent directly using the assistance of a central registry to determine LNs in the area and their contact information (the central registry may be an LN which acts in a special capacity to register LNs and provide information on the registered LNs to requesting LNs). The inter-LN messages may be sent across one or more networks, or may be sent directly (e.g., through wireless communication).

LN 8010 may include mobile communications module 8040 which wirelessly transmits one or more messages to the mobile device and wirelessly receives one or more messages from the mobile device. Mobile communications module 8040 may determine the time that messages used for locating the mobile device are sent and replies from the mobile device are received. LN 8010 may also include a distance calculation module 8050 which may calculate one or more distances from the mobile device to LN 8010 or from the mobile device to one or more other LNs (e.g., listening LNs) based upon timing information determined by the mobile communication module 8040 or received through the LN communication module 8020 from other LNs. Distances may be calculated based upon the formulas disclosed herein. Location calculation module 8060 may utilize the distances calculated by the distance calculation module 8050 to calculate a location using the formulas disclosed herein or other suitable location calculation formulas. Location calculation module 8060 may also determine whether a location cannot be calculated, or cannot be determined to a predetermined degree of accuracy, which indicates an error in the timing measurements or an error or spoofing effort by the mobile device. Location calculation module 8060 may also notify one or more parties (e.g., through LN communication module 8020 or mobile communication module 8040) of an inaccurate location. In some examples, geolocation module 8070 may use the location calculated by the location calculation module 8060 to provide one or more location based services to the mobile device if the location calculation module 8060 may provide a location, or a location within a predetermined degree of accuracy.

In some examples, LNs may have a variety of roles and capabilities and may not contain all the logic shown in FIG. 8. For example, some LNs may be listening nodes only and not messaging nodes. Some nodes may be capable of calculating a distance or position, whereas others may pass their data onto other nodes for these calculations. In some examples, LNs may not provide location based services, they may provide a location for servers or other devices that provide these services. Thus, the modules from FIG. 8 are exemplary and not limiting or required and may vary with the functionality of the LN. Furthermore, the exact delineation of functions as existing in one module vs. another module are exemplary and may vary depending on the implementation.

While the above examples utilized radio waves, other examples may utilize a sound transmission. For example LNs may transmit a sound wave and the mobile device may detect this sound as T2 and may send a sound wave back at T3 as described above for radio waves. The distance d between a receiver and a transmitter may be calculated by multiplying the time it takes for a sound transmission to reach the receiver by c (where c is the speed of sound or ~343.2 m/s).

Figure 9:
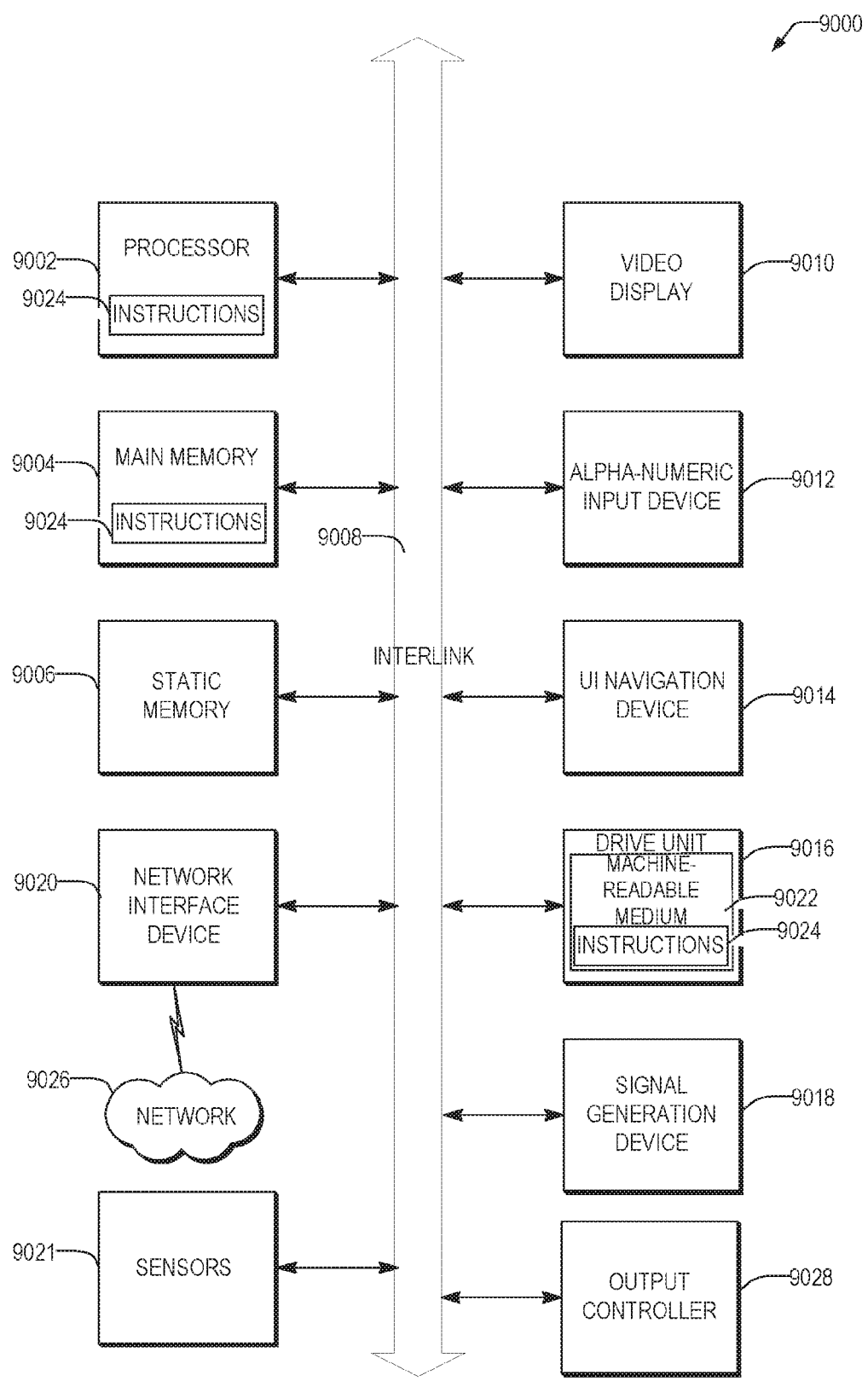
FIG. 9 is a block diagram illustrating an example of a machine upon which one or more embodiments may be implemented.

FIG. 9 illustrates a block diagram of an example machine 9000 upon which any one or more of the techniques (e.g., methodologies) discussed herein may perform. In alternative embodiments, the machine 9000 may operate as a standalone device or may be connected (e.g., networked) to other machines. In a networked deployment, the machine 9000 may operate in the capacity of a server machine, a client machine, or both in server-client network environments. In an example, the machine 9000 may act as a peer machine in peer-to-peer (P2P) (or other distributed) network environment. The machine 9000 may be a Locator Node, a mobile device, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 9000 may include a hardware processor 9002 (e.g., a central processing unit (CPU), a graphics processing unit (GPU), a hardware processor core, or any combination thereof), a main memory 9004 and a static memory 9006, some or all of which may communicate with each other via an interlink (e.g., bus) 9008. The machine 9000 may further include a display unit 9010, an alphanumeric input device 9012 (e.g., a keyboard, gesture device), and a user interface (UI) navigation device 9014 (e.g., a mouse). In an example, the display unit 9010, input device 9012 and UI navigation device 9014 may be a touch screen display. The machine 9000 may additionally include a storage device (e.g., drive unit) 9016, a signal generation device 9018 (e.g., a speaker), a network interface device 9020, and one or more sensors 9021, such as a global positioning system (GPS) sensor, compass, accelerometer, or other sensor. The machine 9000 may include an output controller 9028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 9016 may include a machine readable medium 9022 on which is stored one or more sets of data structures or instructions 9024 (e.g., software) embodying or utilized by any one or more of the techniques or functions described herein. The instructions 9024 may also reside, completely or at least partially, within the main memory 9004, within static memory 9006, or within the hardware processor 9002 during execution thereof by the machine 9000. In an example, one or any combination of the hardware processor 9002, the main memory 9004, the static memory 9006, or the storage device 9016 may constitute machine readable media.

While the machine readable medium 9022 is illustrated as a single medium, the term "machine readable medium" may include a single medium or multiple media (e.g., a centralized or distributed database, and/or associated caches and servers) configured to store the one or more instructions 9024.

The term "machine readable medium" may include any medium that is capable of storing, encoding, or carrying instructions for execution by the machine 9000 and that cause the machine 9000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 9024 may further be transmitted or received over a communications network 9026 using a transmission medium via the network interface device 9020. The Machine 9000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 9020 may include one or more physical jacks (e.g., Ethernet, coaxial, or phone jacks) or one or more antennas to connect to the communications network 9026. In an example, the network interface device 9020 may include a plurality of antennas to wirelessly communicate using at least one of single-input multiple-output (SIMO), multiple-input multiple-output (MIMO), or multiple-input single-output (MISO) techniques. In some examples, the network interface device 9020 may wirelessly communicate using Multiple User MIMO techniques.

Other Notes and Examples

Example 1 is an at least one non-transitory machine readable medium that stores instructions which when performed by a locator node, cause the locator node to perform operations comprising: receiving a response to a first message sent by the locator node at time T1 from a mobile device at a time T2, the response containing an elapsed time between when the mobile device received the first message and when it sent the response; calculating a distance D1 between the mobile device and the locator node using T1, T2, and the elapsed time; calculating a second distance D2 between the mobile device and a second locator node using D1 and a time T3 representing when the second locator node received the response from the mobile device; calculating a third distance D3 between the mobile device and a third locator node using D1 and a time T4 representing when the third locator node received the response from the mobile device; and calculating a position of the mobile device using at least D1, D2, D3, and geolocations of the locator node, the second locator node, and the third locator node.

In Example 2, the subject matter of Example 1 optionally includes, wherein the operations comprise: determining that the elapsed time between when the mobile device received the first message and when it sent the response provided by the mobile device is not accurate based upon determining that the calculated position of the mobile device is below a predetermined threshold of accuracy.

In Example 3, the subject matter of Example 2 optionally includes, wherein the operations comprise: denying access to a location-based services responsive to determining that the elapsed time between when the mobile device received the first message and when it sent the response provided by the mobile device is not accurate.

In Example 4, the subject matter of any one or more of Examples 1-3 optionally include, wherein the operations of calculating the position of the mobile device using at least D1, D2, D3, and the geolocations of the first locator node, the second locator node, and the third locator node comprises: determining that the position of the mobile device is above a predetermined threshold of accuracy; and wherein the operations comprise: in response to determining that the position of the mobile device is above a predetermined threshold of accuracy, calculating a second position using D1, a distance value D2* which is a measure of the distance between the second locator node and the mobile device that was calculated by the second locator node and is a result of a second location procedure, a distance value D3* which is a measure of the distance between the third locator node and the mobile device that was calculated by the third locator node and is a result of a third location procedure, and the geolocations of the first locator node, the second locator node, and the third locator node.

In Example 5, the subject matter of any one or more of Examples 1-4 optionally include, wherein the operations comprise sending a notification to the second and third locator nodes prior to sending the message to the mobile device, the message informing the second and third locator nodes to listen for the response from the mobile device.

In Example 6, the subject matter of any one or more of Examples 1-5 optionally include, wherein the operations comprise synchronizing a clock on the locator node with a clock on the second locator node and a clock on the third locator node.

In Example 7, the subject matter of any one or more of Examples 1-6 optionally include, wherein the operations comprise registering the geolocation of the locator node with a computing device over a network.

In Example 8, the subject matter of any one or more of Examples 1-7 optionally include, wherein the operations comprise sending the geolocation of the locator node to the second and third locator nodes and receiving a geolocation of the second and third locator nodes.

In Example 9, the subject matter of any one or more of Examples 1-8 optionally include, wherein the operations comprise: receiving a second response message from the mobile device sent to the second locator node, the second response message sent in reply to a second message sent to the mobile device by the second locator node; and sending the second locator node a time of arrival of the second response message.

In Example 10, the subject matter of any one or more of Examples 1-9 optionally include, wherein the operations of calculating the position of the mobile device using at least D1, D2, D3, and geolocations of the locator node, the second locator node, and the third locator node comprises the operations of finding a common intersection of three circles with center points at the geolocation of the locator node, the second locator node, and third locator node respectively with radiuses of D1, D2, and D3 respectively.

In Example 11, the subject matter of any one or more of Examples 1-10 optionally include, wherein the operations comprise: calculating a fourth distance D4 between the mobile device and a fourth locator node using D1 and a time T5 when a fourth locator node received the response from the mobile device; and calculating the position of the mobile device using at least D1, D2, D3, D4, and the geolocations of the locator node, the second locator node, the third locator node, and the fourth locator node.

Example 12 is a device comprising: a processor; a non-transitory memory, that stores instructions of an application, which when performed by the processor, cause the device to perform operations comprising: receiving a response to a first message sent by the locator node at time T1 from a mobile device at a time T2, the response containing an elapsed time between when the mobile device received the first message and when it sent the response; calculating a distance D1 between the mobile device and the locator node using T1, T2, and the elapsed time; calculating a second distance D2 between the mobile device and a second locator node using D1 and a time T3 representing when the second locator node received the response from the mobile device; calculating a third distance D3 between the mobile device and a third locator node using D1 and a time T4 representing when the third locator node received the response from the mobile device; and calculating a position of the mobile device using at least D1, D2, D3, and geolocations of the locator node, the second locator node, and the third locator node.

In Example 13, the subject matter of Example 12 optionally includes, wherein the operations comprise: determining that the elapsed time between when the mobile device received the first message and when it sent the response provided by the mobile device is not accurate based upon determining that the calculated position of the mobile device is below a predetermined threshold of accuracy.

In Example 14, the subject matter of Example 13 optionally includes, wherein the operations comprise: denying access to a location-based services responsive to determining that the elapsed time between when the mobile device received the first message and when it sent the response provided by the mobile device is not accurate.

In Example 15, the subject matter of any one or more of Examples 12-14 optionally include, wherein the operations of calculating the position of the mobile device using at least D1, D2, D3, and the geolocations of the first locator node, the second locator node, and the third locator node comprises: determining that the position of the mobile device is above a predetermined threshold of accuracy; and wherein the operations comprise: in response to determining that the position of the mobile device is above a predetermined threshold of accuracy, calculating a second position using D1, a distance value D2* which is a measure of the distance between the second locator node and the mobile device that was calculated by the second locator node and is a result of a second location procedure, a distance value D3* which is a measure of the distance between the third locator node and the mobile device that was calculated by the third locator node and is a result of a third location procedure, and the geolocations of the first locator node, the second locator node, and the third locator node.

In Example 16, the subject matter of any one or more of Examples 12-15 optionally include, wherein the operations comprise sending a notification to the second and third locator nodes prior to sending the message to the mobile device, the message informing the second and third locator nodes to listen for the response from the mobile device.

In Example 17, the subject matter of any one or more of Examples 12-16 optionally include, wherein the operations comprise synchronizing a clock on the locator node with a clock on the second locator node and a clock on the third locator node.

In Example 18, the subject matter of any one or more of Examples 12-17 optionally include, wherein the operations comprise registering the geolocation of the locator node with a computing device over a network.

In Example 19, the subject matter of any one or more of Examples 12-18 optionally include, wherein the operations comprise sending the geolocation of the locator node to the second and third locator nodes and receiving a geolocation of the second and third locator nodes.

In Example 20, the subject matter of any one or more of Examples 12-19 optionally include, wherein the operations comprise: receiving a second response message from the mobile device sent to the second locator node, the second response message sent in reply to a second message sent to the mobile device by the second locator node; and sending the second locator node a time of arrival of the second response message.

In Example 21, the subject matter of any one or more of Examples 12-20 optionally include, wherein the operations of calculating the position of the mobile device using at least D1, D2, D3, and geolocations of the locator node, the second locator node, and the third locator node comprises the operations of finding a common intersection of three circles with center points at the geolocation of the locator node, the second locator node, and third locator node respectively with radiuses of D1, D2, and D3 respectively.

In Example 22, the subject matter of any one or more of Examples 12-21 optionally include, wherein the operations comprise: calculating a fourth distance D4 between the mobile device and a fourth locator node using D1 and a time T5 when a fourth locator node received the response from the mobile device; and calculating the position of the mobile device using at least D1, D2, D3, D4, and the geolocations of the locator node, the second locator node, the third locator node, and the fourth locator node.

Example 23 is a computer-implemented method comprising: using a computer processor: receiving a response to a first message sent by a locator node at time T1 from a mobile device at a time T2, the response containing an elapsed time between when the mobile device received the first message and when it sent the response; calculating a distance D1 between the mobile device and the locator node using T1, T2, and the elapsed time; calculating a second distance D2 between the mobile device and a second locator node using D1 and a time T3 representing when the second locator node received the response from the mobile device; calculating a third distance D3 between the mobile device and a third locator node using D1 and a time T4 representing when the third locator node received the response from the mobile device; and calculating a position of the mobile device using at least D1, D2, D3, and geolocations of the locator node, the second locator node, and the third locator node.

In Example 24, the subject matter of Example 23 optionally includes: determining that the elapsed time between when the mobile device received the first message and when it sent the response provided by the mobile device is not accurate based upon determining that the calculated position of the mobile device is below a predetermined threshold of accuracy.

In Example 25, the subject matter of Example 24 optionally includes: denying access to a location-based services responsive to determining that the elapsed time between when the mobile device received the first message and when it sent the response provided by the mobile device is not accurate.

In Example 26, the subject matter of any one or more of Examples 23-25 optionally include, wherein calculating the position of the mobile device using at least D1, D2, D3, and the geolocations of the first locator node, the second locator node, and the third locator node comprises: determining that the position of the mobile device is above a predetermined threshold of accuracy; and wherein the method comprises: in response to determining that the position of the mobile device is above a predetermined threshold of accuracy, calculating a second position using D1, a distance value D2* which is a measure of the distance between the second locator node and the mobile device that was calculated by the second locator node and is a result of a second location procedure, a distance value D3* which is a measure of the distance between the third locator node and the mobile device that was calculated by the third locator node and is a result of a third location procedure, and the geolocations of the first locator node, the second locator node, and the third locator node.

In Example 27, the subject matter of any one or more of Examples 23-26 optionally include sending a notification to the second and third locator nodes prior to sending the message to the mobile device, the message informing the second and third locator nodes to listen for the response from the mobile device.

In Example 28, the subject matter of any one or more of Examples 23-27 optionally include synchronizing a clock on the locator node with a clock on the second locator node and a clock on the third locator node.

In Example 29, the subject matter of any one or more of Examples 23-28 optionally include registering the geolocation of the locator node with a computing device over a network.

In Example 30, the subject matter of any one or more of Examples 23-29 optionally include sending the geolocation of the locator node to the second and third locator nodes and receiving a geolocation of the second and third locator nodes.

In Example 31, the subject matter of any one or more of Examples 23-30 optionally include: receiving a second response message from the mobile device sent to the second locator node, the second response message sent in reply to a second message sent to the mobile device by the second locator node; and sending the second locator node a time of arrival of the second response message.

In Example 32, the subject matter of any one or more of Examples 23-31 optionally include, wherein calculating the position of the mobile device using at least D1, D2, D3, and geolocations of the locator node, the second locator node, and the third locator node comprises finding a common intersection of three circles with center points at the geolocation of the locator node, the second locator node, and third locator node respectively with radiuses of D1, D2, and D3 respectively.

In Example 33, the subject matter of any one or more of Examples 23-32 optionally include: calculating a fourth distance D4 between the mobile device and a fourth locator node using D1 and a time T5 when a fourth locator node received the response from the mobile device; and calculating the position of the mobile device using at least D1, D2, D3, D4, and the geolocations of the locator node, the second locator node, the third locator node, and the fourth locator node.

Example 34 is a device comprising: means for receiving a response to a first message sent by a locator node at time T1 from a mobile device at a time T2, the response containing an elapsed time between when the mobile device received the first message and when it sent the response; means for calculating a distance D1 between the mobile device and the locator node using T1, T2, and the elapsed time; means for calculating a second distance D2 between the mobile device and a second locator node using D1 and a time T3 representing when the second locator node received the response from the mobile device; means for calculating a third distance D3 between the mobile device and a third locator node using D1 and a time T4 representing when the third locator node received the response from the mobile device; and means for calculating a position of the mobile device using at least D1, D2, D3, and geolocations of the locator node, the second locator node, and the third locator node.

In Example 35, the subject matter of Example 34 optionally includes, wherein the operations comprise: means for determining that the elapsed time between when the mobile device received the first message and when it sent the response provided by the mobile device is not accurate based upon determining that the calculated position of the mobile device is below a predetermined threshold of accuracy.

In Example 36, the subject matter of Example 35 optionally includes, wherein the operations comprise: means for denying access to a location-based services responsive to determining that the elapsed time between when the mobile device received the first message and when it sent the response provided by the mobile device is not accurate.

In Example 37, the subject matter of any one or more of Examples 34-36 optionally include, wherein the means for calculating the position of the mobile device using at least D1, D2, D3, and the geolocations of the first locator node, the second locator node, and the third locator node comprises: means for determining that the position of the mobile device is above a predetermined threshold of accuracy; and means for calculating a second position using D1, a distance value D2* which is a measure of the distance between the second locator node and the mobile device that was calculated by the second locator node and is a result of a second location procedure, a distance value D3* which is a measure of the distance between the third locator node and the mobile device that was calculated by the third locator node and is a result of a third location procedure, and the geolocations of the first locator node, the second locator node, and the third locator node in response to determining that the position of the mobile device is above a predetermined threshold of accuracy.

In Example 38, the subject matter of any one or more of Examples 34-37 optionally include means for sending a notification to the second and third locator nodes prior to sending the message to the mobile device, the message informing the second and third locator nodes to listen for the response from the mobile device.

In Example 39, the subject matter of any one or more of Examples 34-38 optionally include means for synchronizing a clock on the locator node with a clock on the second locator node and a clock on the third locator node.

In Example 40, the subject matter of any one or more of Examples 34-39 optionally include means for registering the geolocation of the locator node with a computing device over a network.

In Example 41, the subject matter of any one or more of Examples 34-40 optionally include means for sending the geolocation of the locator node to the second and third locator nodes and receiving a geolocation of the second and third locator nodes.

In Example 42, the subject matter of any one or more of Examples 34-41 optionally include: means for receiving a second response message from the mobile device sent to the second locator node, the second response message sent in reply to a second message sent to the mobile device by the second locator node; and means for sending the second locator node a time of arrival of the second response message.

In Example 43, the subject matter of any one or more of Examples 34-42 optionally include, wherein the means for calculating the position of the mobile device using at least D1, D2, D3, and geolocations of the locator node, the second locator node, and the third locator node comprises means for finding a common intersection of three circles with center points at the geolocation of the locator node, the second locator node, and third locator node respectively with radiuses of D1, D2, and D3 respectively.

In Example 44, the subject matter of any one or more of Examples 34-43 optionally include: means for calculating a fourth distance D4 between the mobile device and a fourth locator node using D1 and a time T5 when a fourth locator node received the response from the mobile device; and means for calculating the position of the mobile device using at least D1, D2, D3, D4, and the geolocations of the locator node, the second locator node, the third locator node, and the fourth locator node.

What is claimed is:

1. At least one non-transitory machine readable medium that stores instructions which when performed by a locator node, cause the locator node to perform operations comprising:
  receiving a response to a first message sent by the locator node at time T1 from a mobile device at a time T2, the response containing an elapsed time between when the mobile device received the first message and when it sent the response;
  calculating a distance D1 between the mobile device and the locator node using T1, T2, and the elapsed time;
  calculating a second distance D2 between the mobile device and a second locator node using D1, time T2, and a time T3 representing when the second locator node received the response from the mobile device, time T3 being reported to the locator node by the second locator node;
  calculating a third distance D3 between the mobile device and a third locator node using D1, time T2, and a time T4 representing when the third locator node received the response from the mobile device, time T4 being reported to the locator node by the third locator node;
  calculating a position of the mobile device using at least D1, D2, D3, and geolocations of the locator node, the second locator node, and the third locator node;

determining that the elapsed time between when the mobile device received the first message and when it sent the response provided by the mobile device is not accurate based upon determining that the calculated position of the mobile device is below a predetermined threshold of accuracy; and denying access to a location-based services responsive to determining that the elapsed time between when the mobile device received the first message and when it sent the response provided by the mobile device is not accurate.

2. The at least one non-transitory machine readable medium of claim 1, wherein the operations of calculating the position of the mobile device using at least D1, D2, D3, and the geolocations of the locator node, the second locator node, and the third locator node comprises:

determining that the position of the mobile device is above a predetermined threshold of accuracy; and wherein the operations comprise:

in response to determining that the position of the mobile device is above a predetermined threshold of accuracy, calculating a second position using D1, a distance value D2* which is a measure of the distance between the second locator node and the mobile device that was calculated by the second locator node and is a result of a second location procedure, a distance value D3* which is a measure of the distance between the third locator node and the mobile device that was calculated by the third locator node and is a result of a third location procedure, and the geolocations of the locator node, the second locator node, and the third locator node.

3. The at least one non-transitory machine readable medium of claim 1, wherein the operations comprise sending a notification to the second and third locator nodes prior to sending the message to the mobile device, the message informing the second and third locator nodes to listen for the response from the mobile device.

4. The at least one non-transitory machine readable medium of claim 1, wherein the operations comprise synchronizing a clock on the locator node with a clock on the second locator node and a clock on the third locator node.

5. The at least one non-transitory machine readable medium of claim 1, wherein the operations comprise registering the geolocation of the locator node with a computing device over a network.

6. The at least one non-transitory machine readable medium of claim 1, wherein the operations comprise sending the geolocation of the locator node to the second and third locator nodes and receiving a geolocation of the second and third locator nodes.

7. The at least one non-transitory machine readable medium of claim 1, wherein the operations comprise:

receiving a second response message from the mobile device sent to the second locator node, the second response message sent in reply to a second message sent to the mobile device by the second locator node; and sending the second locator node a time of arrival of the second response message.

8. The at least one non-transitory machine readable medium of claim 1, wherein the operations of calculating the position of the mobile device using at least D1, D2, D3, and geolocations of the locator node, the second locator node, and the third locator node comprises the operations of finding a common intersection of three circles with center points at the geolocation of the locator node, the second locator node, and third locator node respectively with radiuses of D1, D2, and D3 respectively.

9. The at least one non-transitory machine readable medium of claim 1, wherein the operations comprise:

calculating a fourth distance D4 between the mobile device and a fourth locator node using D1 and a time T5 when a fourth locator node received the response from the mobile device; and calculating the position of the mobile device using at least D1, D2, D3, D4, and the geolocations of the locator node, the second locator node, the third locator node, and the fourth locator node.

10. A device configured as a locator node, the device comprising:

a processor; and a non-transitory memory, that stores instructions of an application, which when performed by the processor, cause the device to perform operations comprising:

receiving a response to a first message sent by the locator node at time T1 from a mobile device at a time T2, the response containing an elapsed time between when the mobile device received the first message and when it sent the response;

calculating a distance D1 between the mobile device and the locator node using T1, T2, and the elapsed time;

calculating a second distance D2 between the mobile device and a second locator node using D1, time T2, and a time T3 representing when the second locator node received the response from the mobile device, time T3 being reported to the locator node by the second locator node;

calculating a third distance D3 between the mobile device and a third locator node using D1, time T2, and a time T4 representing when the third locator node received the response from the mobile device, time T4 being reported to the locator node by the third locator node;

calculating a position of the mobile device using at least D1, D2, D3, and geolocations of the locator node, the second locator node, and the third locator node;

determining that the elapsed time between when the mobile device received the first message and when it sent the response provided by the mobile device is not accurate based upon determining that the calculated position of the mobile device is below a predetermined threshold of accuracy; and denying access to a location-based services responsive to determining that the elapsed time between when the mobile device received the first message and when it sent the response provided by the mobile device is not accurate.

11. The device of claim 10, wherein the operations of calculating the position of the mobile device using at least D1, D2, D3, and the geolocations of the locator node, the second locator node, and the third locator node comprises:

determining that the position of the mobile device is above a predetermined threshold of accuracy; and wherein the operations comprise:

in response to determining that the position of the mobile device is above a predetermined threshold of accuracy, calculating a second position using D1, a distance value D2* which is a measure of the distance between the second locator node and the mobile device that was calculated by the second locator node and is a result of a second location procedure, a distance value D3* which is a measure of the distance between the third locator node and the mobile device that was calculated by the third locator node and is a result of a third location procedure, and the geolocations of the locator node, the second locator node, and the third locator node.

12. The device of claim 10, wherein the operations comprise sending a notification to the second and third locator nodes prior to sending the message to the mobile device, the message informing the second and third locator nodes to listen for the response from the mobile device.

13. The device of claim 10, wherein the operations comprise synchronizing a clock on the locator node with a clock on the second locator node and a clock on the third locator node.

14. The device of claim 10, wherein the operations comprise registering the geolocation of the locator node with a computing device over a network.

15. The device of claim 10, wherein the operations comprise sending the geolocation of the locator node to the second and third locator nodes and receiving a geolocation of the second and third locator nodes.

16. The device of claim 10, wherein the operations comprise:
receiving a second response message from the mobile device sent to the second locator node, the second response message sent in reply to a second message sent to the mobile device by the second locator node; and
sending the second locator node a time of arrival of the second response message.

17. The device of claim 10, wherein the operations of calculating the position of the mobile device using at least D1, D2, D3, and geolocations of the locator node, the second locator node, and the third locator node comprises the operations of finding a common intersection of three circles with center points at the geolocation of the locator node, the second locator node, and third locator node respectively with radiuses of D1, D2, and D3 respectively.

18. The device of claim 10, wherein the operations comprise:
calculating a fourth distance D4 between the mobile device and a fourth locator node using D1 and a time T5 when a fourth locator node received the response from the mobile device; and
calculating the position of the mobile device using at least D1, D2, D3, D4, and the geolocations of the locator node, the second locator node, the third locator node, and the fourth locator node.

19. A computer-implemented method comprising:
using a computer processor:
receiving a response to a first message sent by a locator node at time T1 from a mobile device at a time T2, the response containing an elapsed time between when the mobile device received the first message and when it sent the response;
calculating a distance D1 between the mobile device and the locator node using T1, T2, and the elapsed time;
calculating a second distance D2 between the mobile device and a second locator node using D1, time T2, and a time T3 representing when the second locator node received the response from the mobile device, time T3 being reported to the locator node by the second locator node;
calculating a third distance D3 between the mobile device and a third locator node using D1, time T2, and a time T4 representing when the third locator node received the response from the mobile device, time T4 being reported to the locator node by the third locator node;
calculating a position of the mobile device using at least D1, D2, D3, and geolocations of the locator node, the second locator node, and the third locator node;
determining that the elapsed time between when the mobile device received the first message and when it sent the response provided by the mobile device is not accurate based upon determining that the calculated position of the mobile device is below a predetermined threshold of accuracy; and
denying access to a location-based services responsive to determining that the elapsed time between when the mobile device received the first message and when it sent the response provided by the mobile device is not accurate.

* * * * *